United States Patent [19]

Mol et al.

[11] Patent Number: 5,698,788

[45] Date of Patent: Dec. 16, 1997

[54] METHOD FOR ANALYSING REGULARLY RECURRING MECHANICAL VIBRATIONS

[75] Inventors: Hendrik Anne Mol, Sleeuwijk; Gerrit Cornelis Van Nijen, Maurik, both of Netherlands

[73] Assignee: SKF Industrial Trading & Development Company B.V., Nieuwegein, Netherlands

[21] Appl. No.: 561,333

[22] Filed: Nov. 21, 1995

[30] Foreign Application Priority Data

Nov. 22, 1994 [NL] Netherlands ............... 9401949

[51] Int. Cl.⁶ .................. G01M 7/00; G01M 13/00
[52] U.S. Cl. .................. 73/659; 73/660; 73/602; 73/593; 364/508
[58] Field of Search .................. 73/659, 660, 593, 73/597, 602; 364/507, 508, 576

[56] References Cited

U.S. PATENT DOCUMENTS

| | | | |
|---|---|---|---|
| 3,345,864 | 10/1967 | Painter et al. | 73/659 |
| 4,322,976 | 4/1982 | Sisson et al. | 73/659 |
| 4,380,172 | 4/1983 | Imam et al. | 73/659 |
| 4,425,798 | 1/1984 | Nagai et al. | 73/659 |
| 4,429,578 | 2/1984 | Darrel et al. | 73/659 |
| 5,150,618 | 9/1992 | Bambara | 73/660 |
| 5,469,745 | 11/1995 | Twerdochlib | 73/660 |
| 5,501,105 | 3/1996 | Hernandez et al. | 73/660 |
| 5,511,422 | 4/1996 | Hernandez | 73/659 |

OTHER PUBLICATIONS

By E. Dorken et al. "Conditioned constant-Q spectra for improved frequency tracking in the presence of interfering signals", *Journal of the Acoustical Society of America*, vol. 95, No. 4, Apr. 1994, pp. 2059–2067.

By T. Usagawa et al., "Analysis of a moving sound source—compensation of the doppler effect", *ICASSP 86 (International Conference on Acoustics, Speech, and Signal Processing)*, vol. 2, Apr. 1986, pp. 1361–1364.

*Primary Examiner*—Hezron E. Williams
*Assistant Examiner*—Richard A. Moller
*Attorney, Agent, or Firm*—Young & Thompson

[57] ABSTRACT

A method for analysing regularly recurring mechanical vibrations comprises the steps of plotting an amplitude/time spectrum associated with the vibrations, dividing the amplitude/time spectrum into time intervals shorter than the shortest time lapse between two consecutive excitations, subjecting those parts of the amplitude/time spectrum defined by each time interval to a Fourier transformation in order to obtain an amplitude/vibration-frequency interval spectrum associated with each time interval, and subjecting those amplitudes in each amplitude/vibration frequency interval spectrum associated with certain vibration frequencies to a Fourier transformation in order to obtain an excitation-frequency spectrum associated with the respective vibration frequency.

3 Claims, 3 Drawing Sheets

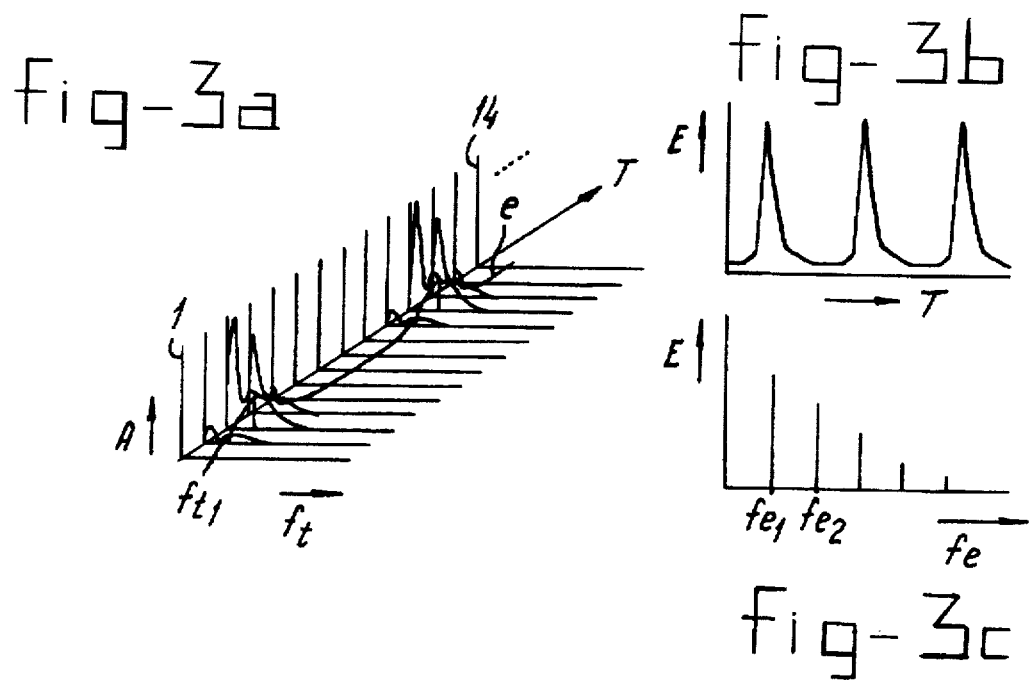
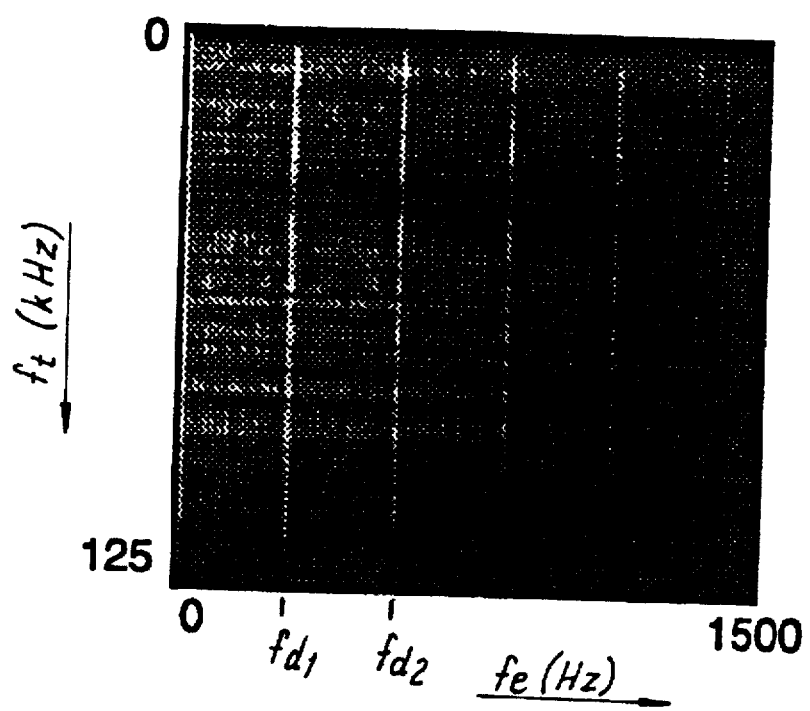

METHOD FOR ANALYSING REGULARLY RECURRING MECHANICAL VIBRATIONS

The invention relates to the analysis of mechanical vibrations such as those which occur in mechanisms which are in operation. These may be mechanisms such as gearboxes, engines and the like. In particular, the analysis of smaller units such as bearings and the like belong to the field of the present invention.

An important application of vibration analysis relates to the location of mechanical faults. In that connection, it is known to locate, for example, cracks, pits and the like in the running surfaces or the rotating components of bearings on the basis of the observed vibration behaviour.

According to a known procedure, the vibration frequencies situated in a certain frequency range are analysed. For example, a transformation to the frequency domain should reveal which vibration phenomena can be attributed to excitations which are connected with the periodical rotations of the various bearing components. Every damaged area in those surfaces of said components which roll over one another manifests itself specifically as a (small) shock or transient as soon as the said damaged area passes the region where rolling contact occurs. In which component a damaged area occurs can then be established on the basis of the time interval between such excitations.

A disadvantage of this known procedure is the loss of information connected with vibrations outside the chosen frequency range. If the frequency range is incorrectly chosen, that is to say precisely in a range in which hardly any vibrations are generated, it is difficult to locate these repetitive excitations. At the same time, it may happen that defects are not noticed in the object concerned. Such an analytical procedure therefore has the disadvantage that it is unreliable.

The object of the invention is to provide an analytical procedure which does not have this disadvantage. Said object is achieved by means of a method For analysing regularly recurring mechanical vibrations, comprising the steps of plotting an amplitude/time spectrum associated with said vibrations, dividing the amplitude/time spectrum into time intervals shorter than the shortest time lapse between two consecutive excitations, the start times of the time intervals being consecutive and the time intervals overlapping one another, subjecting those parts of the amplitude/time spectrum defined by each time interval to a Fourier transformation in order to obtain an amplitude/vibration-frequency interval spectrum associated with each time interval, subjecting those amplitudes in each amplitude/vibration-frequency interval spectrum associated with certain vibration frequencies to a Fourier transformation in order to obtain an excitation-frequency spectrum associated with the respective vibration frequency.

Those frequencies with which the object under investigation is excited can be read off directly from the said excitation-frequency spectrum. From the excitation frequencies found in this way, the geometrical properties of the object, for example a bearing, and the rotation speeds thereof, which component is the cause of said excitations can then be deduced. Finally, it can be established whether there is a defect in the respective component.

In order to facilitate the reading-off of the excitation frequencies, the method according to the invention may also comprise the steps of collecting a number of excitation-frequency spectra associated with consecutive frequencies in a vibration-frequency/excitation-frequency spectrum, reproducing the amplitude associated with each combination of vibration frequency and excitation frequency.

Reading-off of the vibration-frequency/excitation-frequency spectrum can be facilitated if the magnitude of the amplitudes is shown by means of different colours.

If, therefore, there is a defect on one of the surfaces of those parts of a bearing which roll over one another, the bearing will be excited whenever said defect enters the region where rolling contact occurs. That implies that, as a consequence of said excitation, transient vibrations are generated which have different frequencies.

In this case, all these various vibrations are in each case triggered at the same instant. That phenomenon can be identified in a vibration-frequency/excitation-frequency diagram in the form of an easily recognizable line. Said line clearly shows at which excitation frequency all the vibration frequencies are triggered in each case, after which, as already explained above, the excitation source can be located on the basis of the speeds of rotation and the geometrical properties of the bearing.

The method according to the invention will be explained in greater detail below with reference to an exemplary embodiment shown in the figures.

FIG. 2 shows a three-dimensional graph with the vibration amplitudes as a function of time and the vibration frequencies occurring for each time interval 1 and so on.

FIG. 3a shows a three-dimensional graph corresponding to FIG. 2, in which the excitation curve e against time is shown for vibration frequency $f_{t1}$.

FIG. 3b shows the section, with respect to $f_{t1}$, of the amplitude E in the time T.

FIG. 3c shows the amplitude E for each discrete excitation frequency $f_{e1}$, $f_{e2}$, etc.

FIG. 4 shows the total spectrum, that is to say the amplitude as a function of the vibration frequencies and excitation frequencies, reproduced in a diagram.

Figure 1:
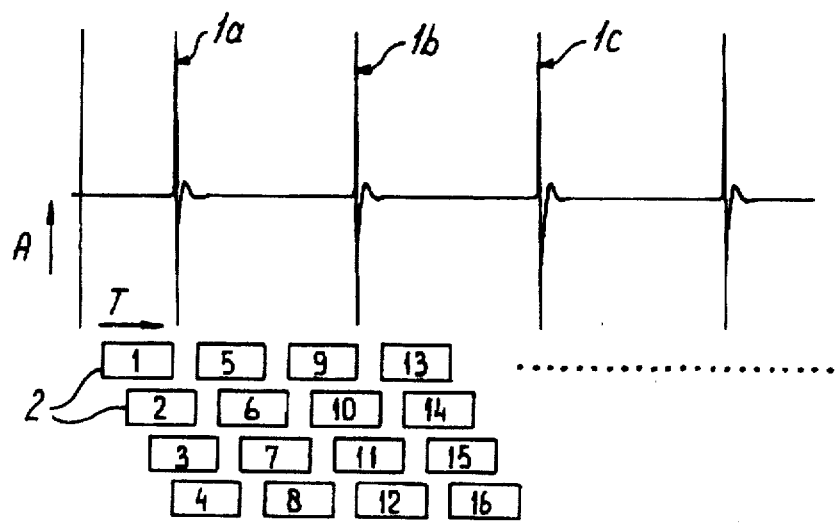
FIG. 1 shows a graph with the vibration amplitudes as a function of time, together with time intervals 1 to 16.

The graph shown in FIG. 1 relates to the amplitude curve of an input signal against time, which signal may be connected, for example, with a surface defect in a body of revolution of a bearing. Whenever said defect enters the region in which rolling contact occurs between that rotating component and a ring, an impulse or transient is generated which repeats at regular intervals. Said transients are indicated by 1a, 1b, 1c and so on. In reality, the signal observed in a rolling bearing will have a random pattern since other sources of vibration also play a part therein. For the sake of simplicity, however, an input signal having a clearly observable, regularly repeating transient has been chosen in FIG. 1.

According to the invention, this signal is divided into time intervals 1, 2, 3 and so on, which time intervals, when viewed along the time axis, are in each case shorter than the time interval between two consecutive transients. In addition, the time intervals 1, 2, 3 and so on overlap one another in such a way that no information can be lost.

Figure 2:
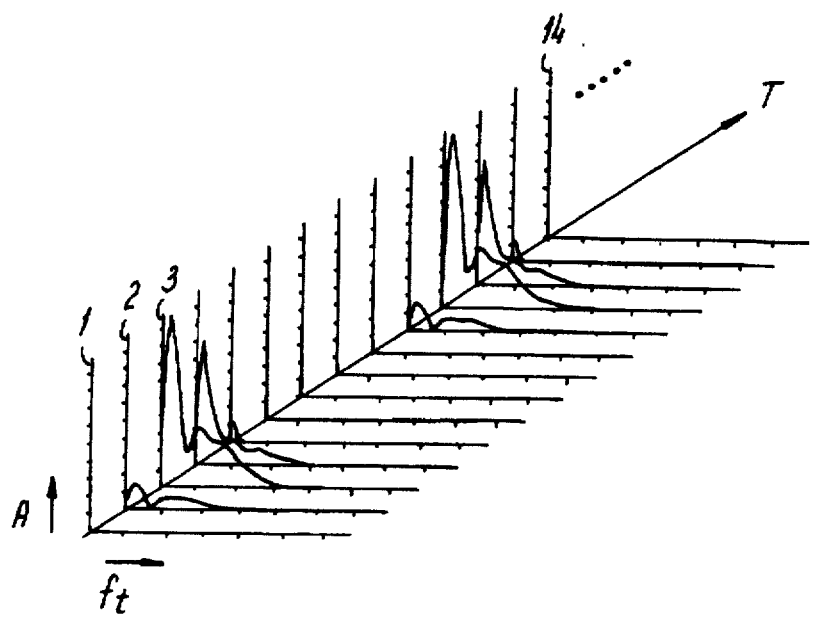

The three-dimensional graph of FIG. 2 shows which vibration frequencies occur in the respective time intervals as defined in FIG. 1. Said time intervals are shown as discrete graphs which are situated one behind the other along the time axis and which are again indicated by 1, 2, 3 and so on. As is to be expected, not a single frequency occurs in time interval 1 since, as FIG. 1 reveals, said interval coincides with a section of the time axis in which the signal is zero. On the other hand, time interval 2 occurs in the region in which transient 1a appears. The vibration phenomena occurring therein are converted by means of a Fourier transformation into the vibration frequencies with associated amplitudes as shown at 2 in FIG. 2. The same is true of the subsequent time intervals 3, 4 and so on.

As shown in FIG. 3a, in a subsequent step according to the method, which amplitude curve e is associated with a particular vibration frequency, for example $f_{r1}$, is then investigated in the various consecutive time intervals.

The energy content E of the respective said amplitude curve e against time is then shown in FIG. 3b.

By means of a second Fourier transformation, which excitation frequencies $f_e$ play a part therein and the energy content they have can then be determined by means of a second Fourier transformation: see FIG. 3c. From FIG. 3c, it may be concluded that a vibration having frequency $f_{r1}$ as shown in FIG. 3a is excited at excitation frequencies $f_{e1}$, $f_{e2}$ and so on.

If such a transformation is carried out for all the relevant frequencies $f_r$, as shown in FIG. 3a, the picture as shown in FIG. 4 can be obtained. The various vibration frequencies $f_r$ are shown along the vertical axis and the excitation frequencies $f_e$ are shown along the horizontal axis. Such a figure can be plotted by indicating the magnitude of the energy content associated with each excitation frequency $f_e$ as shown in FIG. 3c by a different colour or, in this case, by a different intensity of grey.

In this connection, in FIG. 4, clearly identifiable excitation frequencies $F_{e1}$, $f_{e2}$ and so on are observed which indicate a defect.

On the basis of the speeds of rotation of the various parts of the bearing, and also of the geometry thereof, which component must have a defect can be established on the basis of said frequencies $f_{e1}$ and $f_{e2}$.

Figure 5:
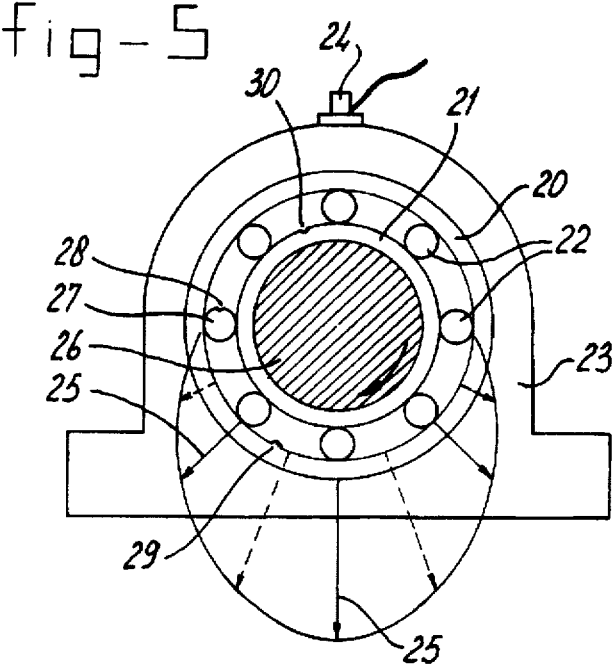
FIG. 5 shows a bearing with various surface defects.

As an example of an object to which the method described above can be applied, FIG. 5 shows a bearing having various defects. Said bearing comprises, in a conventional manner, an outside ring 20, an inside ring 21, and rotating components 22. The bearing is accommodated in a bearing housing 23 on which there is mounted a sensor 24 which is suitable for registering mechanical vibrations. FIG. 5 also shows diagrammatically the forces 25 with which the various rotating components 22 (and consequently also the outside ring 20 and the inside ring 21) are loaded as a consequence of a radial load on shaft 26.

Figure 6A:
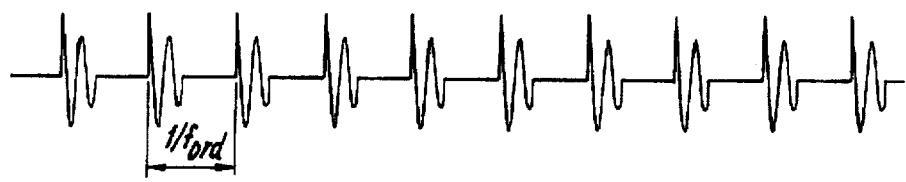
FIGS. 6a, 6b, 6c show graphs containing vibration phenomena such as those occurring in the bearing shown in FIG. 5.

In the example of FIG. 5, one of the rotating components 27 has a surface defect 28. Outside ring 20 and inside ring 21 also have respective surface defects 29, 30. During rotation of the inside ring, each surface defect 28, 29, 30 periodically comes into contact with another bearing component, as a result of which the transients as shown in FIGS. 6a, b, c are generated. Said transients, which are registered by sensor 24, are recognizable by their shape as will be explained below.

FIG. 6a shows the transients, plotted against time, associated with defect 29 in the outside ring 20. Since the outside ring 20 does not rotate, each rotating component will exert one and the same force at the point of defect 29, as a result of which all the transients in FIG. 6a are identical. The frequency with which said transients are generated is $f_{ord}$. Their period time is $1/f_{ord}$.

Figure 6B:
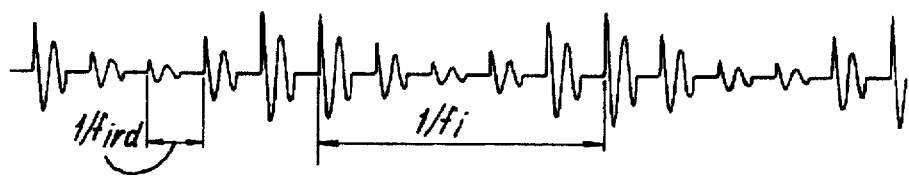

FIG. 6b shows the transients, plotted against time, as a consequence of a defect in the inside ring 21. Since the inside ring 21 rotates, the position of defect 30 alters and, consequently, the force alters which is exerted by a rotating component 22 at the position of defect 30. In FIG. 6b, this effect can be observed in the variation in the magnitude of the transients, the frequency thereof being $f_{ird}$. The frequency of rotation of the inside ring itself is $f_1$.

Figure 6C:
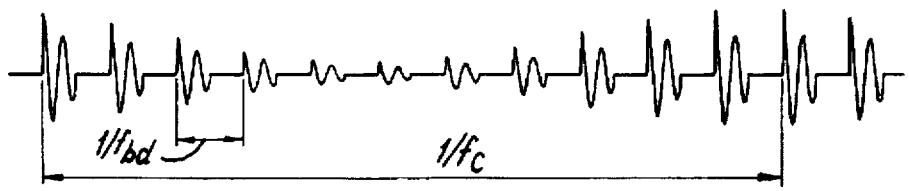

FIG. 6c, shows the transients, plotted against time, which are connected with a defect 28 in rotating component 27. Since the rotating components circulate, the magnitude also varies during this process. The frequency of said transients is $f_{bd}$; the frequency with which a rotating component circulates is $f_c$.

In a practical case, the separately shown transients illustrated above are concealed in a vibration signal which is registered by sensor 24 and which has a random pattern. In said vibration signal, vibrations also occur which originate from other sources of vibration. With the method explained with reference to FIGS. 1–4, however, the frequencies $f_{ord}$, $f_{ird}$ and $f_{bd}$ can be extracted from said vibration signal detected by sensor 24.

We claim:

1. Method for analysing regularly recurring mechanical vibrations, comprising the steps of plotting an amplitude/time spectrum associated with said vibrations, dividing the amplitude/time spectrum into time intervals shorter than the shortest time lapse between two consecutive excitations, the start times of the time intervals being consecutive and the time intervals overlapping one another, subjecting those parts of the amplitude/time spectrum defined by each time interval to a Fourier transformation in order to obtain an amplitude/vibration-frequency interval spectrum associated with each time interval, and subjecting those amplitudes in each amplitude/frequency interval spectrum associated with certain vibration frequencies to a Fourier transformation in order to obtain an excitation-frequency spectrum associated with said respective vibration frequency.

2. Method according to claim 1, comprising the steps of collecting a number of excitation-frequency spectra associated with consecutive frequencies in a vibration-frequency/excitation-frequency spectrum, and displaying the amplitude associated with each combination of vibration frequency and excitation frequency.

3. Method according to claim 2, comprising the step of displaying the magnitude of the amplitudes by means of various colours.

* * * * *